US011157309B2

(12) United States Patent
Wang et al.

(10) Patent No.: US 11,157,309 B2
(45) Date of Patent: Oct. 26, 2021

(54) OPERATING CLUSTER COMPUTER SYSTEM WITH COUPLING FACILITY

(71) Applicant: International Business Machines Corporation, Armonk, NY (US)

(72) Inventors: Zhao Yu Wang, Beijing (CN); Jing Wen Chen, Beijing (CN); Wei Song, Beijing (CN); Hui Wang, Beijing (CN); Xin Xin Dong, Beijing (CN); Ming Qiao Shang Guan, Beijing (CN); Yu Mei Dai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/380,214

(22) Filed: Apr. 10, 2019

(65) Prior Publication Data

US 2020/0326976 A1 Oct. 15, 2020

(51) Int. Cl.
*G06F 9/44* (2018.01)
*G06F 9/48* (2006.01)
*G06F 3/06* (2006.01)
*G06F 11/34* (2006.01)
*G06F 11/30* (2006.01)

(52) U.S. Cl.
CPC .......... *G06F 9/4856* (2013.01); *G06F 3/0604* (2013.01); *G06F 3/065* (2013.01); *G06F 3/067* (2013.01); *G06F 11/3024* (2013.01); *G06F 11/3495* (2013.01)

(58) Field of Classification Search
CPC .................................................. G06F 9/4856
See application file for complete search history.

(56) References Cited

U.S. PATENT DOCUMENTS

| 5,313,647 | A | * | 5/1994 | Kaufman | G06F 11/1438 714/E11.13 |
| 5,522,045 | A | * | 5/1996 | Sandberg | G06F 12/1072 709/215 |
| 5,907,716 | A | * | 5/1999 | Yoshimura | G06F 7/76 710/54 |
| 8,135,930 | B1 | * | 3/2012 | Mattox | G06F 3/067 711/162 |
| 9,723,097 | B2 | | 8/2017 | Harris | |
| 10,042,739 | B2 | | 8/2018 | Tai | |
| 2016/0077921 | A1 | * | 3/2016 | Yoshinari | G06F 9/00 714/19 |
| 2016/0275123 | A1 | * | 9/2016 | Lin | G06F 9/5083 |
| 2017/0109388 | A1 | * | 4/2017 | Brewster | G06F 16/248 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Jae U Jeon
(74) *Attorney, Agent, or Firm* — Andrew Aubert (57) ABSTRACT

Disclosed are techniques for migrating the execution of a task from a first host system to a second host system by copying a snapshot of data required for starting the execution of a task from memory of the first host system to memory of a coupling facility, monitoring the execution of the task on the first host system, and, upon detecting failure of the execution of the task on the first host system, initiating execution of the task on the second host system by copying the snapshot of data from the memory of the coupling facility to the memory of the second host system.

17 Claims, 6 Drawing Sheets

(56) References Cited

U.S. PATENT DOCUMENTS

| | | | |
|---|---|---|---|
| 2017/0123855 A1* | 5/2017 | Li | G06F 9/5055 |
| 2017/0286270 A1* | 10/2017 | Hufnagel | G06F 11/3688 |
| 2017/0337138 A1* | 11/2017 | Li | G06F 12/0246 |
| 2018/0307576 A1* | 10/2018 | Debnath | G06F 11/0775 |

* cited by examiner

COPYING SNAPSHOT OF DATA REQUIRED FOR STARTING EXECUTION OF TASK FROM MEMORY OF FIRST HOST SYSTEM TO MEMORY OF COUPLING FACILITY
710

---

MONITORING EXECUTION OF TASK ON FIRST HOST SYSTEM
720

---

CAUSING SECOND HOST SYSTEM TO TAKE OVER FIRST HOST SYSTEM IN RESPONSE TO DETERMINATION THAT EXECUTION OF TASK FAILS
730

FIG. 7

OPERATING CLUSTER COMPUTER SYSTEM WITH COUPLING FACILITY

BACKGROUND

The present invention relates to cluster computing systems and, in particular, to reliable operation of cluster computer systems with a coupling facility.

Cluster computer systems are widely used for applications like machine learning and data analysis. Some cluster computer systems comprise a coupling facility and a plurality of standalone host computer systems with CPU and memory in their own space address. Each host system may logically have a master node and a worker node. The master node is the manager of the host system and will allocate the worker node to run a computer program, sometimes using virtual machines and/or containers. The worker node will execute the program to perform tasks of an application. The plurality of host computer systems is coupled to the coupling facility configured to facilitate data sharing among the plurality of host systems.

As of 11 Mar. 2019, the Wikipedia entry for "coupling facility" states as follows: "In [certain] mainframe computers, a Coupling Facility or CF is a piece of computer hardware which allows multiple processors to access the same data. A Parallel Sysplex relies on one or more Coupling Facilities (CFs). A coupling facility is a mainframe processor (runs in an own LPAR, with dedicated physical CP, defined thru HMC), with memory and special channels (CF Links), and a specialized operating system called Coupling Facility Control Code (CFCC). It has no I/O devices, other than the CF links. The information in the CF resides entirely in memory as CFCC is not a virtual memory operating system. A CF typically has a large memory—of the order of several gigabytes. In principle any [suitable] mainframe can serve as a coupling facility. The CF runs no application software."

As of 14 Mar. 2019, the Wikipedia entry for "container (virtualization)" states as follows: "In computing, a container is an isolated user space in which computer programs run directly on the host operating system's kernel but have access to a restricted subset of its resources. A computer program running on an ordinary operating system can see all resources (connected devices, files and folders, network shares, CPU power, quantifiable hardware capabilities) of that computer. However, programs running inside a container can only see the container's portion of the file system and the devices assigned to it. The mechanism by which a host operating system runs programs in isolated user-space environments is called containerization or operating-system-level virtualization."

SUMMARY

According to an aspect of the present invention, there is a method, computer program product and/or system for use with a first host computer system (FHCS) having an FHCS memory and a coupling facility (CF) having a CF memory, with the FHCS is one of a plurality of host computer systems coupled to the coupling facility configured to facilitate data sharing among the plurality of host computer systems that performs the following operations (not necessarily in the following order): (i) receiving a snapshot of data required for starting the execution of a task from the FHCS memory; (ii) copying, by one or more processing units, the snapshot to the CF memory; (iii) monitoring, by one or more processing units, the execution of the task on the FHCS to determine that the execution of the task has failed to complete on the FHCS; and (iv) responsive to the determination that the execution of the task has failed to complete on the FHCS: (a) storing a copy of the snapshot from the CF memory on a second host computing system (SHCS) memory in an SHCS, and (b) performing execution of the task by the SHCS based on the copy of the snapshot stored in the SHCS memory.

According to one embodiment of the present invention, a computer-implement method is provided. The method comprises copying a snapshot of data required for starting the execution of a task from a memory of a first host system to a memory of a coupling facility, wherein the first host system is one of a plurality of host systems coupled to the coupling facility configured to facilitate data sharing among the plurality of host systems. The method comprises monitoring, the execution of the task on the first host system. In response to a determination that the execution of the task is failed to complete, causing a second host system of the plurality of host systems to take over the first host system, comprising: copying the snapshot from the coupling facility to a memory of the second host system and starting the second host system based on the snapshot copied to the memory of the second host system.

According to another embodiment of the present invention, a system comprises one or more processors and a computer-readable memory coupled to the one or more processors. The computer-readable memory comprising instructions that when executed by the one or more processors perform the following actions. Copying a snapshot of data required for starting the execution of a task from a memory of a first host system to a memory of a coupling facility, wherein the first host system is one of a plurality of host systems coupled to the coupling facility configured to facilitate data sharing among the plurality of host systems. Monitoring, the execution of the task on the first host system. In response to a determination that the execution of the task is failed to complete, causing a second host system of the plurality of host systems to take over the first host system, comprising: copying the snapshot from the coupling facility to a memory of the second host system and starting the second host system based on the snapshot copied to the memory of the second host system.

According to another embodiment of the present invention, a computer program product comprises a computer readable storage medium having program instructions embodied therewith is provided. The program instructions are executable by a processor to cause the processor to perform the following actions. Copying a snapshot of data required for starting the execution of a task from a memory of a first host system to a memory of a coupling facility, wherein the first host system is one of a plurality of host systems coupled to the coupling facility configured to facilitate data sharing among the plurality of host systems. Monitoring, the execution of the task on the first host system. In response to a determination that the execution of the task is failed to complete, causing a second host system of the plurality of host systems to take over the first host system, comprising: copying the snapshot from the coupling facility to a memory of the second host system and starting the second host system based on the snapshot copied to the memory of the second host system.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
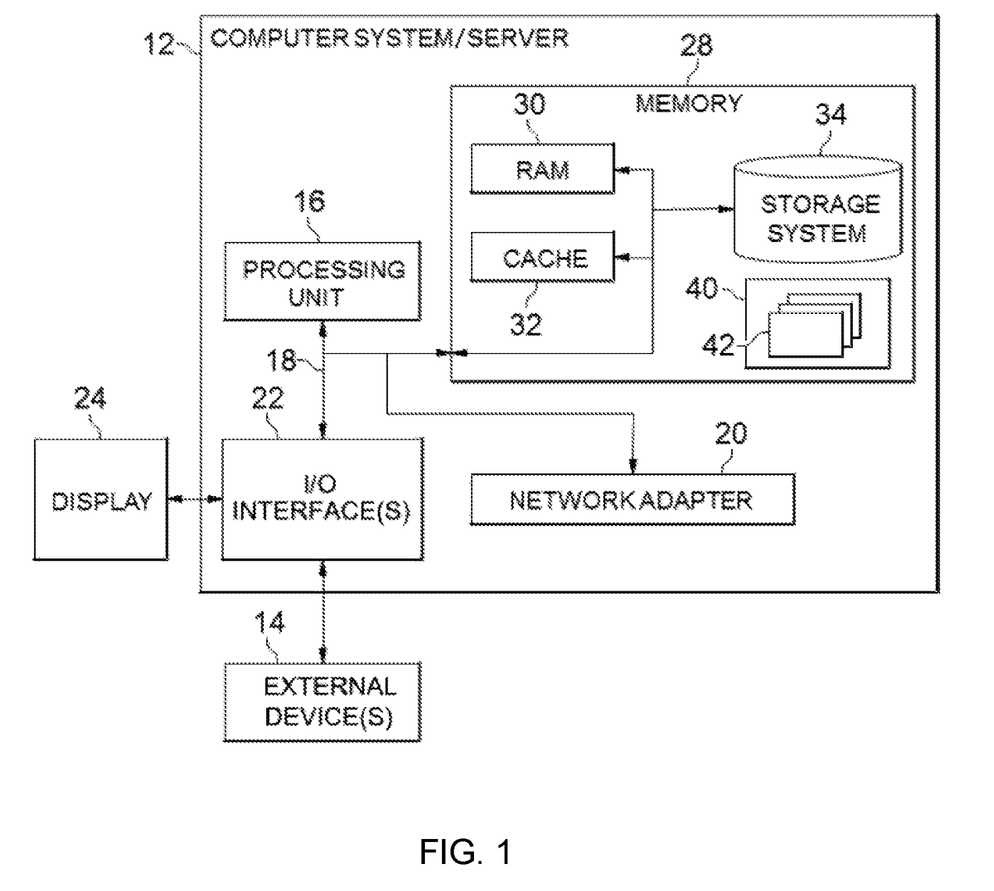
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
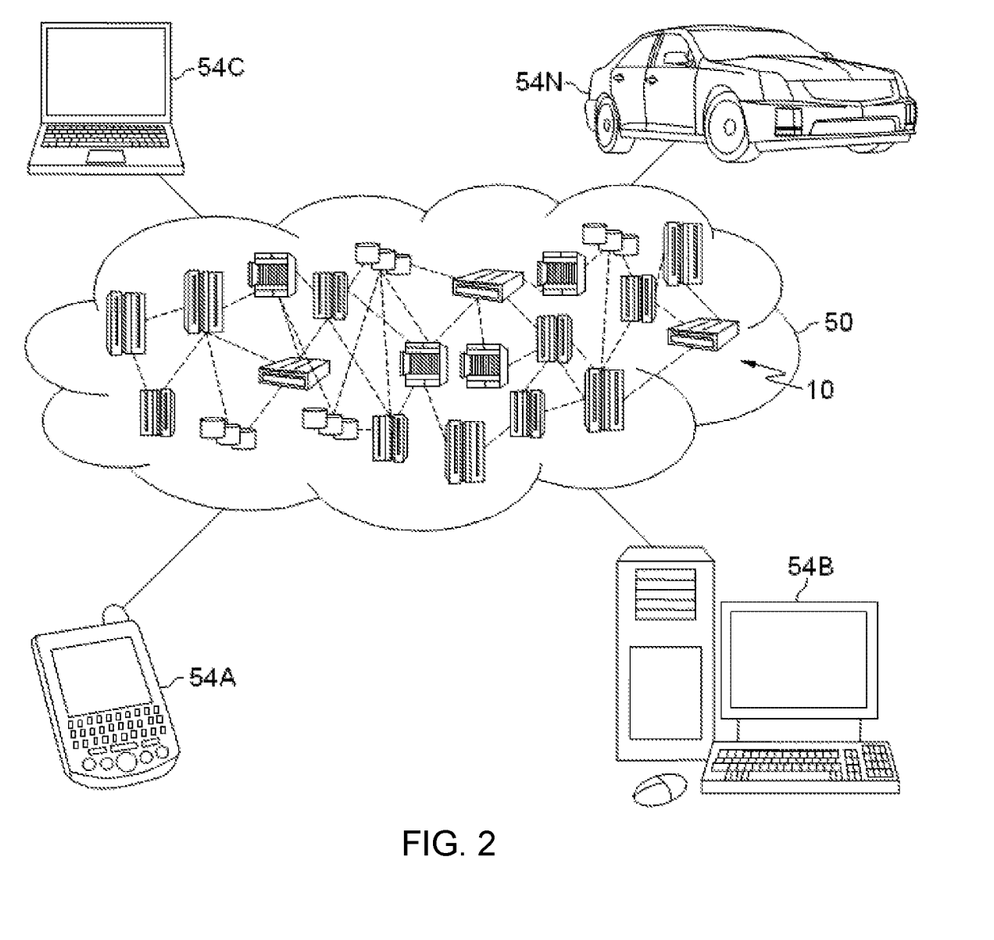
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
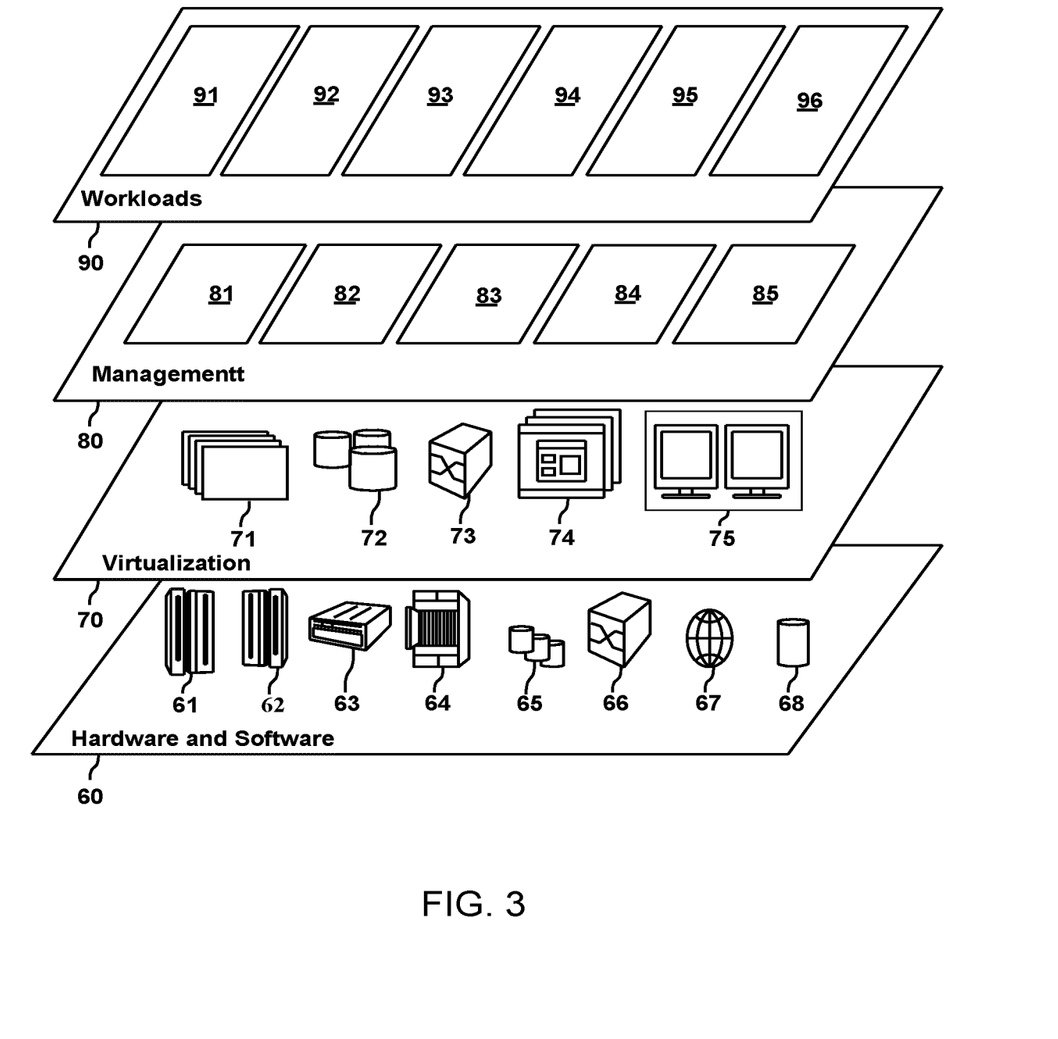
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96. Service processing 96 may implement a solution of operating a cluster computing system with a coupling facility as described hereinafter in this disclosure.

With reference now to FIG. 4 to FIG. 7, exemplary embodiments of the present invention will be described. The exemplary embodiments are directed to a computer implemented method (CIM), computer system (CS) and computer program product (CPP) for operating a cluster computing system with a coupling facility (CF).

It should be noted that the processing of the method for operating a cluster computing system with a coupling facility according to embodiments of this disclosure could be implemented by computer system/server 12 of FIG. 1.

Figure 4:
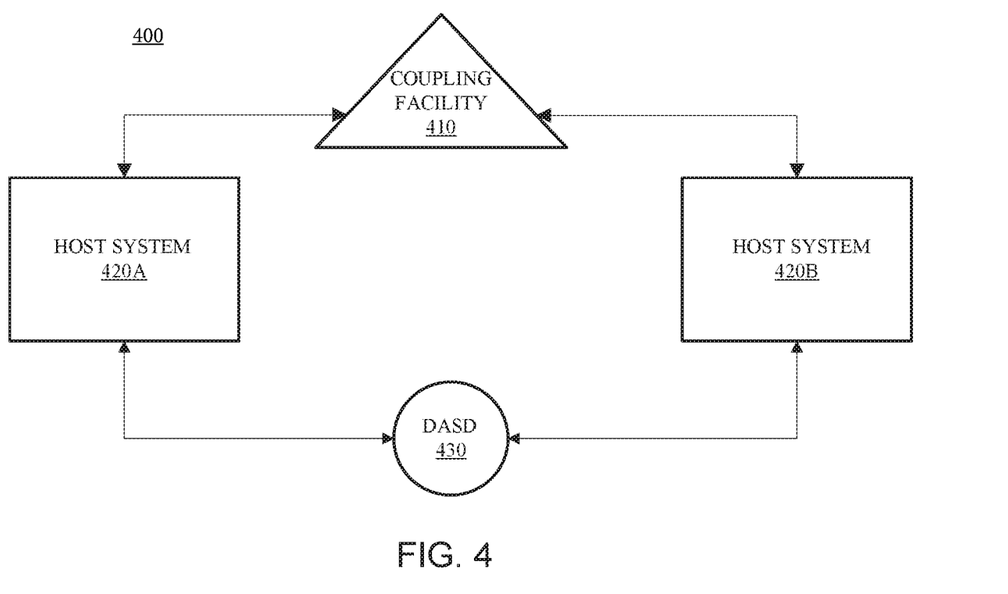
FIG. 4 illustratively shows a block diagram of a cluster computing system according to an embodiment of the present invention.

Now refer to FIG. 4, which illustratively shows in block diagram a cluster computing system according to an embodiment of the present invention.

Specifically, FIG. 4 depicts a cluster computing system 400. System 400 includes a plurality of host systems 420A, 420B. Host systems 420A, 420B are coupled to or communicatively connected to with a coupling facility 410. Each host system may include a processor (or a processor(s) set including one or more computer processor unit(s) (CPUs)), a memory, and the like. The processors execute computer readable programs as known to those skilled in the art. Although two host systems are depicted, the cluster computing system 400 may include any suitable number of host systems. In the following description, they will also be generally denoted by reference number 420 where it is not necessary to distinguish between them.

Each host system 420 may be embodied as a virtual machine or container provided by a mainframe computer, which may be of any type of computing device, such as a personal desktop computer, laptop computer, smartphone computer, server computer, and the like, as illustrated in FIG. 2. The mainframe computer includes an operating system (OS). Specifically, the mainframe computer may be partitioned into multiple Logical Partitions (LPARs) and each of the LPARs is a virtual machine (VM) comprising a virtualization of the mainframe's resources and may host a separate instance of the operating system. Each host system 420 may logically have a master node and a worker node. The master node is the manager of the host system and will allocate the worker node to run a computer program, also called executor. The worker node will execute the program to perform the task of an application for data analysis, for example. The task may be one of several threads of the executor.

As is known in the art, coupling facility 410 is used for building cluster computing systems such as system 400 and may serve to coordinate data access and synchronization by host systems 420. It may communicate with host systems 420 through coupling facility channels (not shown). Coupling facility 410 includes a processor, memory and specialized operating system. It may be separately embodied from the host systems 420 as depicted. For example, it may be embodied as a separate mainframe computer. In certain embodiments, coupling facility 410 may execute in an LPAR on a mainframe computer external from host systems 420. The LPAR may be specialized to execute coupling facility code, such as Coupling Facility Control Code (CFCC) commonly known in the art.

Coupling facility 410 may be configured by a coupling facility resource management (CFRM), a specialized data set which specifies behavior and other specifications of the coupling facility 410. Coupling facility 410 may provide buffering and/or caching for shared data among host systems. Specifically, coupling facility 410 may provide dedicated portions of memory called structures for reference by the host systems 420. One of the structures is list structure, as is well known in the art.

It is to be noted that although a single coupling facility 410 is depicted, in certain embodiments, system 400 may include multiple coupling facilities.

Host systems 420 communicate with a direct access storage devices (DASD) 430 shared among host systems 420. DASD 430 may comprise secondary storage devices, disk arrays, and the like. Host systems 420 may save data to or read data from the DASD 430. Specifically, DASD 430 may store data sets for access by host systems 420, and host systems 420 may access data from DASD 430 according to a virtual storage access method (VSAM). It is to be noted that although only one DASD 430 is depicted, the system 400 may include any suitable number of such DASDs.

Figure 5:
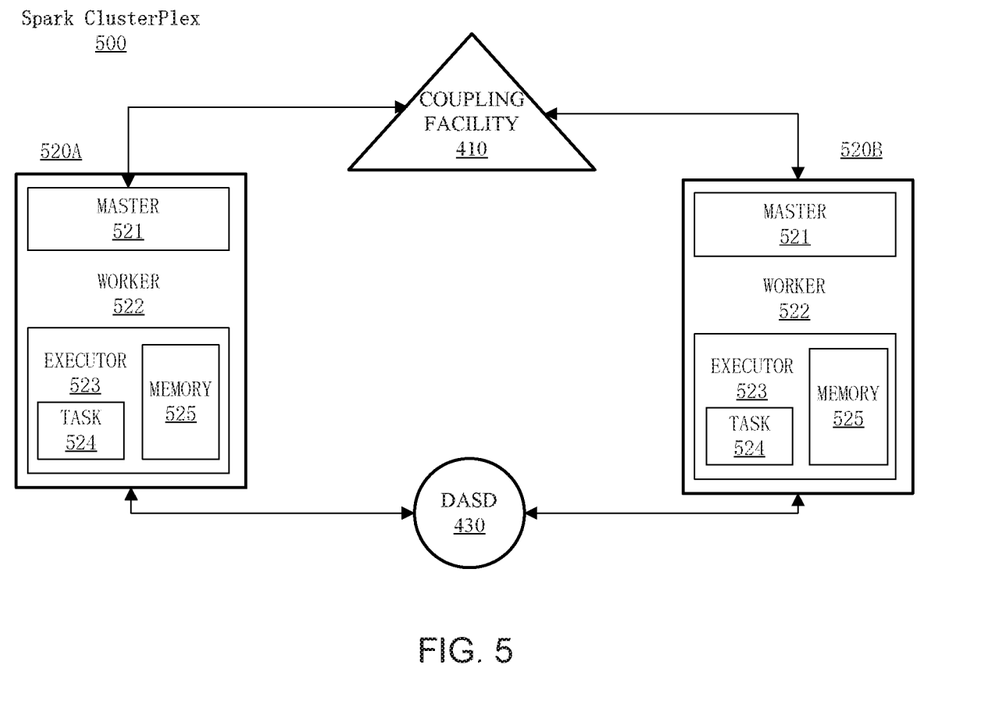
FIG. 5 illustratively shows a block diagram of another cluster computing system according to an embodiment of the present invention.

Turn to FIG. 5, which shows an Apache® Spark based cluster computing system 500, also referred to as Spark ClusterPlex 500 in this disclosure, according to an exemplary embodiment of the present invention. Other types of cluster computing systems may be used by other embodiments of the present invention, such as cluster computing systems known by those of ordinary skill in the art that are not based on Apache. As a matter of fact, Spark ClusterPlex 500 may be regarded as an embodiment of cluster computing system 400. As can be seen from FIG. 5, the topology of Spark ClusterPlex 500 is basically the same as cluster computing system 400. As shown, Spark ClusterPlex 500 comprises a plurality of Spark systems 520A and 520B, corresponding to host system 420A and 420B of FIG. 4 respectively, that are coupled to coupling facility 410 for coordination and data sharing. Spark systems 520A and 520B may also save data to and read data from DASD 430. It is to be noted that although only two Spark systems 520A and 520B are depicted, Spark ClusterPlex 500 may have any suitable number of Spark systems. Similarly, in the following description, the plurality of Spark systems will also be generally denoted by reference number 520 where it does not lead to confusion.

The plurality of Spark systems 520 are Spark enabled. As shown, each Spark system 520 may have a Master 521 and a Worker 522. Master 521 serves as the manager of Spark system 520. It may allocate Worker 522 to run Executor 523, embodied as a computer program, to execute task 524 of a Spark application. Task 524 may be one of several threads of Executor 523. Worker 522 will run Executor 523 to execute task 524. Memory 525 holds the data required for running Executor 523, such as executable instruction codes. Memory 525 also stores variables associated with the execution of the instruction codes. In addition, memory 525 may also stores data that are generated by Executor 523.

Generally, memory 525 includes three areas: Reserved Memory, User Memory and Working Memory. Reserved Memory is the portion of memory 525 reserved by the system, and its size is hardcoded and may vary depending on systems. User Memory is the memory pool that remains after the allocation of Working Memory. As Reserved Memory and User Memory are not relevant to embodiments of the present invention, description of their details will be omitted herein so as not to obscure the understanding of embodiments of the present invention. It is to be noted that, for the same reason, details of other components associated with Spark systems 520, such as a driver for submitting jobs to Spark systems 520, will be omitted herein as they are not relevant to embodiments of the present invention.

Figure 6:
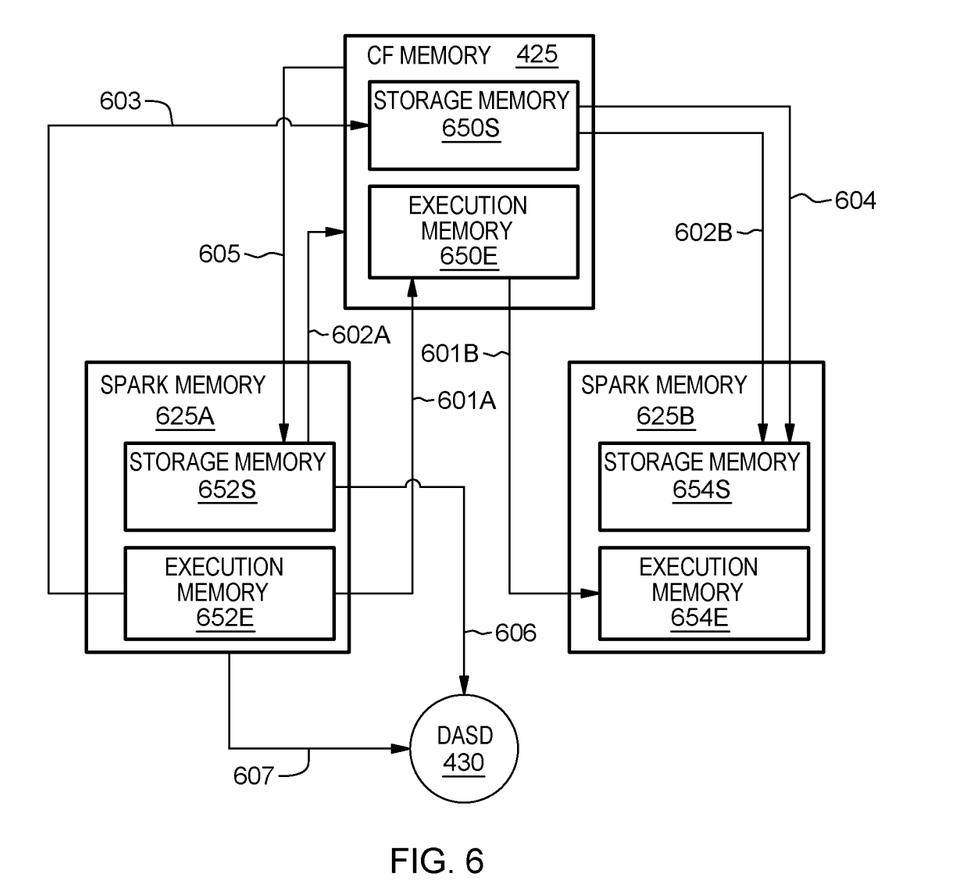
FIG. 6 illustratively shows conceptual division of memory of a cluster computing system.

The Working Memory is also referred to as Spark memory. Refer to FIG. 6, which illustrates the conceptual division of the Working Memory portion of memory 525 of Spark system 520 and the memory of coupling facility 410.

In FIG. 6, there are shown a Spark memory 625A and a Spark memory 625B. Spark memory 625A represents the Working Memory portion of memory 525 of Spark system 520A of FIG. 5 and Spark memory 625B represents the Working Memory portion of memory 525 of Spark system 520B. For simplicity, in the following description, Spark memory 625A and 625B will also be collectively referred to as Spark memory 625 where it does not lead to confusion. For ease of description, Spark memory 625 may be conceptually categorized into storage memory and execution memory according to function and usage. The execution memory is a pool of Spark memory 625 for storing the objects required for and during the execution of Spark tasks. For example, in the case of Map-Reduce applications, the execution memory is used to store shuffle intermediate buffer on the Map side in memory. For another example, the execution memory is used to store hash table for hash aggregation step. The storage memory is pool of the Spark memory responsible for storing data to be buffered, such as Persist data sets and Unroll data sets as well as Broadcast data sets, as is well known in the art.

As shown in FIG. 6, Spark memory 625A may be conceptually categorized into storage memory 652S and execution memory 652E, and Spark memory 625B may be conceptually categorized into storage memory 654S and execution memory 654E.

For ease of description, the memory of coupling facility 410 may also be conceptually categorized into different portions in a similar way. As shown in FIG. 6, CF memory 425 of coupling facility 410 may also be considered to have at least a storage memory 650S and an execution memory 650E.

With the understanding of cluster computing system 400 and Spark clusterPlex 500, description of embodiments of method for operating cluster computing system may now be provided below with respect to cluster computing system 400 and Spark clusterPlex 500.

Figure 7:
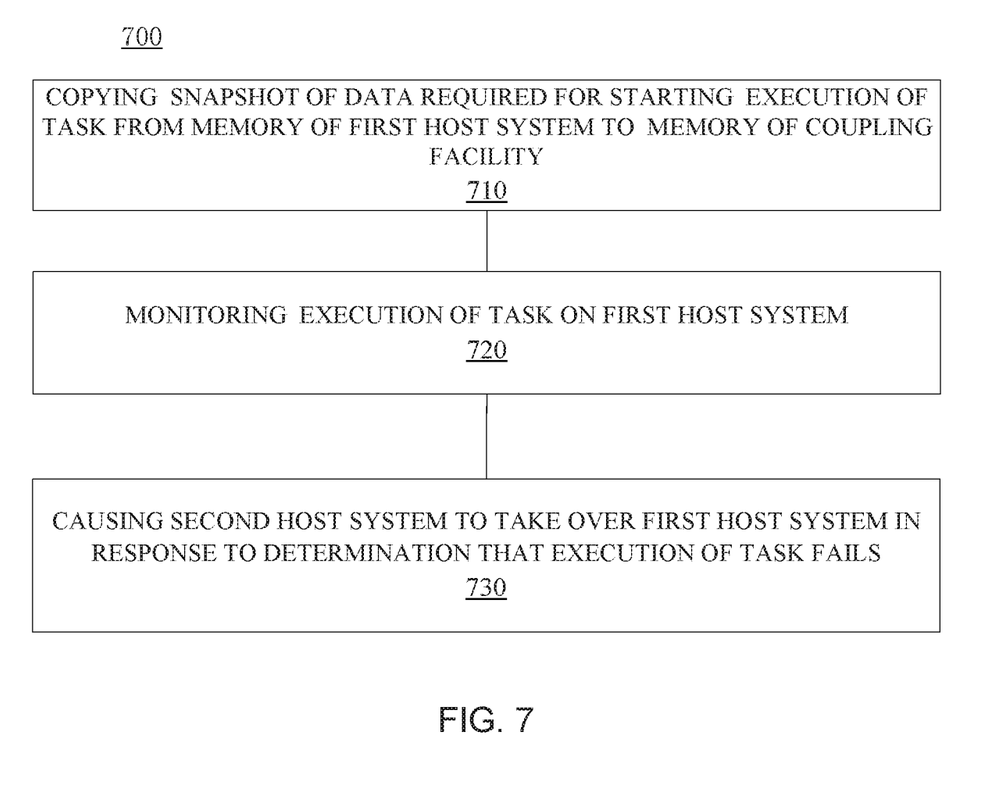
FIG. 7 is a flowchart of the general process of a method according to an embodiment of the present invention.

Turning to FIG. 7, which shows a flowchart of the general process of a computer-implemented method 700 for operating a cluster computing system with a coupling facility. Method 700 may be implemented in cluster computing system 400 which comprises a plurality of host systems coupled to a coupling facility configured to facilitate data sharing among the plurality of host systems. Generally, method 700 comprises Steps 710, 720 and 730. Step 710 involves copying a snapshot of data required for starting the execution of a task from a memory of a first host system to a memory of the coupling facility. Step 720 involves monitoring the execution of the task on the first host system. Step 730 involves causing a second host system of the plurality of host systems to take over the first host system in response to a determination that the execution of the task is failed. Those skilled in the art shall recognize that Steps 710, 720 and 730 represent a portion of the total processing for the operation of cluster computing systems having a coupling facility. Integration of these steps with the overall methods of operation of the cluster computing system is merely a matter of design choices. Further, those skilled in the art shall appreciate that a variety of equivalent methods and techniques may be implemented for the operation of cluster computing systems with configuration and protocol similar or equivalent to the exemplary cluster computing system 400.

As shown in FIG. 7, method 700 starts at Step 710, following proper initialization of cluster computing system 400 wherein information and data are ready for a first host system 420A to execute a task of an application.

Step 710 involves copying a snapshot of data required for starting the execution of a task from a memory of a first host system to a memory of a coupling facility 410. For ease of description, assume host system 420A in FIG. 4 represents the first host system. As described above, host system 420A is one of a plurality of host systems 420 coupled to coupling facility 410 configured to facilitate data sharing among the plurality of host systems 420.

As shall be appreciated by those skilled in the art, the term "snapshot" may refer to a copy of a dataset at a time of point. Here, the snapshot of data required for starting the execution may refer to a copy of dataset including image of data readily configured for starting the execution.

The task to be executed may be one of a sequence of tasks of a specific application, for example a Spark application for data analysis. In that case, the tasks are executed one by one consecutively. For example, if task_n−1 and task_n are two consecutive tasks, and task_n is a current task to be executed, then it may be said that task_n, the current task, is executed immediately following task_n−1. A task may be further divided into several stages, for example stage_m−1 and stage_m, for execution one by one consecutively. Similarly, assume stage_m is a current stage, then stage_m is said to be executed immediately following stage_m−1. In the case that tasks are executing in stages, the snapshot of data required for starting the execution of a task in Step 710 shall be understood to be the snapshot of data required for starting the execution of the current stage, stage_m, of the task.

According to an embodiment of the present invention, the plurality of host systems 420 may be embodied as Spark systems 520 of Spark ClusterPlex 500 as shown in FIG. 5. In that case, host system 420A is embodied as Spark system 520A. As described above, Spark system 520A comprises master node 521 and worker node 522. Task_n is allocated to worker 521 by master 522 of Spark system 520A.

To be illustrative, in Step 710, the snapshot may be copied from execution memory 652E of Spark memory 625A of Spark system 520A to execution memory 650E of CF memory 425 of CF 410. Specifically, the snapshot may be copy to a corresponding list structure in CF 410. As discussed above, list structure is a kind of structures corresponding to dedicated portions of memory 425.

The action of copying the snapshot in Step 710 is illustratively depicted by a solid line 601A.

According to an embodiment of the present invention, method 700 may further comprise copying program variables associated with the execution of the task along with the snapshot from the memory of the first host system to the memory of the coupling facility. For example, in the case of Spark Clusterplex 500, Broadcast variables are program variables that are associated with the execution of tasks. If there are Broadcast variables buffered in Spark memory 625A, they will be copied to CF memory 425. This action is illustratively depicted by a solid line 602A, which indicates to copy the Broadcast variables from storage memory 652S of Spark memory 625A to storage memory 650S of CF memory 425.

Then, the process proceeds to Step 720, which involves monitoring the execution of the task, task_n, on host system 420A. In the case of Spark ClusterPlex 500, Step 720 involves monitoring the execution of task_n on Spark system 520A. The purpose of monitoring the execution is to determine whether or not the execution is completed successfully. This may be realized using any techniques known in the art. For example, a heart-beat mechanism well known in the art may be employed to monitor the execution of the task on host system 420A and/or Spark system 520A to detect whether there is any failure occurring during the execution. In addition, host system 420A and Spark system 520A may also signify successful completion of the execution in any suitable manner.

The outcome of Step 720 may be a determination that the execution is completed successfully. It may also be that the execution of is not completed due to a failure. Depending on the outcome, Step 730 may be performed, as shall be described later below.

It shall be appreciated by those skilled in the art that normally the execution would be completed successfully. To have a better understanding of the overall operations of the clustering system, it would be advantageous to know how the method will proceed upon successful completion of the execution prior to discussing how the method will proceed upon unsuccessful completion.

According to an embodiment of the present invention, in response to a determination that the execution is completed, method 700 may perform a data-saving step which involves saving data generated as a result of the execution of the task to the memory of the coupling facility.

Specifically, if it turns out from Step 720 that the execution of current task_n is completed successfully, then a set of data generated from the execution of task_n, denoted as data_n, will be saved to memory 425 of CF 410. More specifically, data_n will be saved to a corresponding list structure in storage memory 650S. This action is illustratively depicted by a solid line 603, which indicates to save data_n generated from task_n to storage memory 650S of CF memory 425. Data_n saved in CF memory 425, as well as those data generated for previous tasks, such as task_n−1, that have also been saved, may be accessed for other tasks, such as subsequent task_n+1.

According to an embodiment of the present invention, the task is executed by executing a sequence of stages. Then saving data generated as a result of the execution in the data-saving step comprises saving data generated as a result of the execution of one of the stages. For example, task_n is the current task to be executed by executing a sequence of stages. One of the stages, stage_m, is the current stage to be executed. Then saving data generated as a result of the execution of task_n comprises saving data, data_m, generated as a result of the execution of stage_m. Similarly, data_m saved in CF memory 425, as well as those data generated for previous stages, such as stage_m−1, that have also been saved, may be accessed for other stage and/or tasks, such as subsequent stage_m+1 and/or task_n.

According to an embodiment of the present invention, saving data resulted from the execution of one of the stages, stage_m, comprises saving the data from the memory of the first host system to the memory of the coupling facility by performing at least one of the PERSIST action and the UNROLL action.

As is known in the art, in the case of Spark ClusterPlex 500, PERSIST data and UNROLL data are two types of data generated in Spark system 520A for example. Conventionally, they are generated and buffered in execution memory 652E. According to the embodiment, PERSIST data may be saved to storage memory 650S of CF 410 by performing the PERSIST action. Similarly, UNROLL data may also be saved to storage memory 650S of CF 410 by performing the UNROLL action. As PERSIST and UNROLL data as well as related PERSIST and UNROLL actions are well known in the art, details of their description will be omitted herein so as not obscure embodiments of the present invention.

Above descriptions provide various embodiments of actions taken in response to successful completion of execution of a task or a task stage. However, it is possible that the execution of the task or task stage cannot be completed, for example, due to a failure of host system 420A or Spark system 520A for various reasons.

With the understanding of the process upon successful completion of the execution according to embodiments of the present invention, description may now be provided as to the process upon successful completion. Turn to FIG. 7. In response to a determination that the execution of the task is failed to complete, Step 730 will be performed, which involves causing a second host system of the plurality of host systems to take over the first host system. This may be done in two sub-steps. The first sub-step is copying the snapshot from the coupling facility to the memory of the second host system.

The second host system may be selected from the plurality of host systems in different ways. For example, it may be selected randomly or on the basis of certain criteria or consideration, such as load balance. Assume host system 420B or Spark system 520B is designated as the second host system. In the first sub-step, the snapshot, which is previously copied from host system 420A (or Spark system 520A) to CF 410 in Step 710, will be copied to host system 420B (or Spark system 520B) from CF 410. This action is illustratively depicted by line 601B, which indicates the copying of the snapshot from CF memory 425 to execution memory 654E of Spark system 520B, for example. As mentioned above, program variables, such as Broadcast variables, associated with the execution of task_n may have been copied from host system 420A (or Spark system 520A) to CF 410 along with the snapshot. In that case, method 700 will copy the program variables from CF 410 to host system 420B (or Spark system 520B) along with the snapshot. This action is illustratively depicted by line 602B, which indicates the copying of the program variables, such as Broadcast variables, from storage memory 650S of CF 410 to storage memory 654S of host system 420B (or Spark system 520B).

After the first sub-step, the second sub-step may start the second host system based on the snapshot copied to the memory of the second host system.

Specifically, with reference to FIG. 6, now that the snapshot is copied to the execution memory 654E of host system 420B (or Spark system 520B) in the first sub-step, host system 420B (or Spark system 520B) may be triggered to start operation based on the snapshot, as well as associated program variables, such as Broadcast variables, if any. Because the snapshot comprises image of data configured for starting the execution of the task or task stage, host system 420B (or Spark system 520B) takes over host system 420A (or Spark system 520A) virtually by re-starting the execution of the task or task stage. Thereby, the execution of the task or task stage failed on host system 420A (or Spark system 520A) will be resumed on host system 420B (or Spark system 520B).

According to an embodiment of the present invention, after host system 420B takes over host system 420A, host system 420B may directly access sharable data in CF memory 425. This is illustrated depicted by a solid line 604 denoting data flow from storage memory 650S to host system 420B. For example, after the execution of the current task_n is resumed on host system 420B, host system 420B may directly access data_n−1 that have been saved to storage memory 650S from host system 420A for task_n−1 of which the execution was successfully completed on host system 420A. Likewise, after the execution of the current task_m is resumed on host system 420B, host system 420B may directly access data_m−1 that have been saved to storage memory 650S from host system 420A for stage_n−1 of which the execution was successfully completed on host system 420A.

Embodiments of the flow of process of method 700 are described in the above paragraphs with respect to host system 420A and host system 402B in cluster computing system 400. It is to be noted that the process flow may also applied to other peer host systems (not shown) that are a part of the cluster computing system.

It is also to be noted that the process flow may be performed cyclically for consecutive tasks or stages, each cycle for one of the tasks or stages.

As shall be appreciated by those skilled in the art, in each cycle, data_n (or data_m) is generated for a current stage, task_n (or a current stage, stage_m), and saved to CF memory 425. In time, the available space of CF memory 425 may become shrunken.

It is contemplated that method 700 may comprise further steps to manage CF memory 425. For example, in the case discussed above with respect to host system 420A, assume a series of data, data_n-x, data_n-x−1, . . . , data_n−1 generated on host system 420A have been saved in CF memory 425. Then if it is decided to increase available space of CF memory 425, a part of the series of data may be moved back to host system 420A, for example in a FIFO (First In First Out) fashion. Thereby, the space of CF memory 425 occupied by the part of the series of data may be released.

In general, according to an embodiment of the present invention, method 700 may further comprising moving a part of data from the memory of the coupling facility to memory of a corresponding host system on which the data is generated in FIFO fashion so as to release the space of the memory of the coupling facility.

In the case discussed above, the corresponding host system is host system 420A or Spark system 520A. And in the case of Spark system 520A, a part of the PERSIST data and the UNROLL data may be moved from CF memory 425 to Spark memory 625A of Spark system 520A. This action is illustratively denoted by a solid line 605 in FIG. 6, which indicates the moving of data from storage memory 650S to storage memory 652S.

It is noted that a host system may also release its memory by moving data to DASD 430. For example, Spark system 520 may move a part of data from storage memory 652A to DASD, as depicted by solid line 606. Similarly, Spark system 520 may move a part of data from execution memory 652B to DASD 430 as depicted by solid line 607.

Embodiments of the present invention have been described above, particularly with respect to Spark application as an example. However, the principle of the invention is by no means limited to the example. As noted above, those skilled in the art shall appreciate that, as design choices, a variety of equivalent or alternative methods and techniques in accordance with the principle of the invention may be implemented for the operation of cluster computing systems with configuration and protocol similar or equivalent to the exemplary cluster computing system and/or Spark Cluster-Plex. Therefore, those design choices shall be construed as falling into the scope and spirit of the embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method (CIM) for use with (i) a first host computer system (FHCS) having both an FHCS execution memory and a FHCS storage memory and (ii) a coupling facility (CF) having both a CF execution memory and a CF storage memory, where the FHCS is one of a plurality of host computer systems coupled to the coupling facility configured to facilitate data sharing among the plurality of host computer systems, the method comprising:
    receiving a snapshot of data required for starting execution of a task from the FHCS execution memory, with the task corresponding to a plurality of stages for sequential execution;
    copying, by one or more processing units, the snapshot to the CF execution memory;
    monitoring, by the one or more processing units, the execution of the task sequentially proceeding through the plurality of stages on the FHCS, including:
        for each given stage of the plurality of stages that is successfully completed, copying a snapshot of data corresponding to the FHCS execution memory at the time of completion of the given stage to the CF storage memory, and
        responsive to failing to execute a stage of the plurality of stages before completing execution of a final stage of the plurality of stages, determining that the task has failed to complete on the FHCS, and responsive to the determination that the execution of the task has failed to complete on the FHCS:
- selecting, by the one or more processing units, a second host computing system (SHCS) from the plurality of host computer systems for continued execution of the task based, at least in part, on load balancing information,
- storing, by the one or more processing units, a copy of the snapshot from the CF storage memory corresponding to the snapshot copied from the FHCS for completion of a stage immediately prior in the sequential execution to the stage that failed to execute to execution memory in the SHCS,
- establishing, by the one or more processing units, a direct access connection between sharable data in CF storage memory and the SHCS corresponding to sharable data relevant to performance of the task, and
- performing, by the one or more processing units, continued execution of the task beginning at the stage that failed to execute by the SHCS based on the copy of the snapshot stored in the SHCS execution memory and the sharable data.

2. The computer implemented method of claim 1, further comprising:
saving, by one or more processing units, data generated as a result of the execution to the CF storage memory in response to a determination that the execution is completed.

3. The computer implemented method of claim 2, further comprising:
- copying, by one or more processing units, program variables associated with the execution of the task along with the snapshot from the FHCS execution memory to the CF execution memory; and
- copying, by one or more processing units, the program variables along with the snapshot from the CF execution memory to the SHCS execution memory,
- wherein starting the SHCS based on the snapshot copied to the SHCS execution memory comprises starting the SHCS based on the program variables as well as the snapshot copied to the SHCS execution memory.

4. The computer implemented method of claim 3, wherein the program variables are Broadcast variables.

5. The computer implemented method of claim 2, wherein the host systems are Spark systems each of which comprising a master node and a worker node, and wherein the task is allocated to a worker node by a master node of the first host system.

6. The computer implemented method of claim 1, wherein the copied snapshot of data corresponding to the FHCS execution memory at the time of completion of the given stage to the CF storage memory comprises saving the data from the FHCS memory to the CF memory by performing a PERSIST action.

7. The computer implemented method of claim 6, further comprising:
responsive to determining to increase available space of CF storage memory, moving, by the one or more processing units, a part of data corresponding to the task from the CF storage memory to the SHCS memory in FIFO (First In First Out) fashion so as to release space occupied by the part of data of the CF storage memory; and responsive to moving the part of data to the SHCS memory, moving at least some data from the SHCS to a direct access storage device.

8. A computer program product (CPP) for use with (i) a first host computer system (FHCS) having both an FHCS execution memory and a FHCS storage memory and (ii) a coupling facility (CF) having both a CF execution memory and a CF storage memory, where the FHCS is one of a plurality of host computer systems coupled to the coupling facility configured to facilitate data sharing among the plurality of host computer systems, the CPP comprising:
a machine readable storage device; and
computer code stored on the machine readable storage device, with the computer code including instructions for causing a processor(s) set to perform operations including the following:
- receiving a snapshot of data required for starting execution of a task from the FHCS execution memory, with the task corresponding to a plurality of stages for sequential execution,
- copying the snapshot to the CF execution memory,
- monitoring, by the one or more processing units, the execution of the task sequentially proceeding through the plurality of stages on the FHCS, including:
  - for each given stage of the plurality of stages that is successfully completed, copying a snapshot of data corresponding to the FHCS execution memory at the time of completion of the given stage to the CF storage memory, and
  - responsive to failing to execute a stage of the plurality of stages before completing execution of a final stage of the plurality of stages, determining that the task has failed to complete on the FHCS, and
- responsive to the determination that the execution of the task has failed to complete on the FHCS:
  - selecting, by the one or more processing units, a second host computing system (SHCS) from the plurality of host computer systems for continued execution of the task based, at least in part, on load balancing information,
  - storing, by the one or more processing units, a copy of the snapshot from the CF storage memory corresponding to the snapshot copied from the FHCS for completion of a stage immediately prior in the sequential execution to the stage that failed to execute to execution memory in the SHCS,
  - establishing, by the one or more processing units, a direct access connection between sharable data in CF storage memory and the SHCS corresponding to sharable data relevant to performance of the task, and
  - performing, by the one or more processing units, continued execution of the task beginning at the stage that failed to execute by the SHCS based on the copy of the snapshot stored in the SHCS execution memory and the sharable data.

9. The CPP of claim 8, wherein the computer code further includes instructions for causing the processor(s) set to perform the following operations:
saving, by one or more processing units, data generated as a result of the execution to the CF storage memory in response to a determination that the execution is completed.

10. The CPP of claim 9, wherein the host systems are Spark systems each of which comprising a master node and a worker node, and wherein the task is allocated to a worker node by a master node of the first host system.

11. The CPP of claim 10, wherein the copied snapshot of data corresponding to the FHCS execution memory at the time of completion of the given stage to the CF storage memory comprises saving the data from the FHCS memory to the CF memory by performing a_PERSIST action.

12. The CPP of claim 11, wherein the computer code further includes instructions for causing the processor(s) set to perform the following operations:
   responsive to determining to increase available space of CF storage memory, moving, by the one or more processing units, a part of data corresponding to the task from the CF storage memory to the SHCS memory in FIFO (First In First Out) fashion so as to release space occupied by the part of data of the CF storage memory; and
   responsive to moving the part of data to the SHCS memory, moving at least some data from the SHCS to a direct access storage device.

13. A computer system (CS) for use with (i) a first host computer system (FHCS) having both an FHCS execution memory and a FHCS storage memory and (ii) a coupling facility (CF) having both a CF execution memory and a CF storage memory, where the FHCS is one of a plurality of host computer systems coupled to the coupling facility configured to facilitate data sharing among the plurality of host computer systems, the CS comprising:
   a processor(s) set;
   a machine readable storage device; and
   computer code stored on the machine readable storage device, with the computer code including instructions for causing the processor(s) set to perform operations including the following:
      receiving a snapshot of data required for starting execution of a task from the FHCS execution memory, with the task corresponding to a plurality of stages for sequential execution,
      copying the snapshot to the CF execution memory,
      monitoring, by the one or more processing units, the execution of the task sequentially proceeding through the plurality of stages on the FHCS, including:
         for each given stage of the plurality of stages that is successfully completed, copying a snapshot of data corresponding to the FHCS execution memory at the time of completion of the given stage to the CF storage memory, and
      responsive to failing to execute a stage of the plurality of stages before completing execution of a final stage of the plurality of stages, determining that the task has failed to complete on the FHCS, and
      responsive to the determination that the execution of the task has failed to complete on the FHCS:
         selecting, by the one or more processing units, a second host computing system (SHCS) from the plurality of host computer systems for continued execution of the task based, at least in part, on load balancing information,
         storing, by the one or more processing units, a copy of the snapshot from the CF storage memory corresponding to the snapshot copied from the FHCS for completion of a stage immediately prior in the sequential execution to the stage that failed to execute to execution memory in the SHCS,
         establishing, by the one or more processing units, a direct access connection between sharable data in CF storage memory and the SHCS corresponding to sharable data relevant to performance of the task, and
         performing, by the one or more processing units, continued execution of the task beginning at the stage that failed to execute by the SHCS based on the copy of the snapshot stored in the SHCS execution memory and the sharable data.

14. The CS of claim 13, wherein the computer code further includes instructions for causing the processor(s) set to perform the following operations:
   saving, by one or more processing units, data generated as a result of the execution to the CF storage memory in response to a determination that the execution is completed.

15. The CS of claim 14, wherein the host systems are Spark systems each of which comprising a master node and a worker node, and wherein the task is allocated to a worker node by a master node of the first host system.

16. The CS of claim 15, wherein the copied snapshot of data corresponding to the RIGS execution memory at the time of completion of the given stage to the CF storage memory comprises saving the data from the FHCS memory to the CF memory by performing a_PERSIST action.

17. The CS of claim 16, wherein the computer code further includes instructions for causing the processor(s) set to perform the following operations:
   responsive to determining to increase available space of CF storage memory, moving, by the one or more processing units, a part of data corresponding to the task from the CF storage memory to the SHCS memory in FIFO (First In First Out) fashion so as to release space occupied by the part of data of the CF storage memory; and
   responsive to moving the part of data to the SHCS memory, moving at least some data from the SHCS to a direct access storage device.

* * * * *